2,877,243

METHOD OF PREPARING OMEGA MERCAPTO ALKANOIC ACIDS AND ESTERS

John A. Brockman, Jr., Woodcliff Lake, N. J., and Paul F. Fabio, Pearl River, N. Y., assignors to American Cyanamid Company, New York, N. Y., a corporation of Maine No Drawing. Application March 6, 1956
Serial No. 569,699

7 Claims. (Cl. 260—399)

This invention relates to new thiolaliphatic acids. More practically, it relates to substituted-omega-thiolaliphatic acids and esters and methods of preparing the same.

The compound 6-thioctic acid has been described as having growth promoting activity for certain microorganisms including S. faecalis, Tetrahymena geleii and some Corynebacterium species. This compound can also be described chemically as omega-[3-(1,2-dithiolanyl)]valeric acid. This compound is generally prepared by the closing of a 6,8-dithioloctanoic acid or ester to form a ring having adjacent sulfur atoms in the ring. On the other hand, if the thiol group in the 6-position of 6,8-dithioloctanoic acid and in a similar position in homologous aliphatic acid is replaced with an alkyl radical, an entirely new class of compounds is produced which inhibit the growth of microorganisms, bacteria and fungi, as shown hereinafter.

The new compounds of the present invention may be illustrated by the following formula:

$$R'-O-\underset{\underset{O}{\|}}{C}(CH_2)_n\underset{\underset{R}{|}}{C}H CH_2 CH_2$$
$$\phantom{R'-O-C(CH_2)_nCH}\underset{SH}{|}$$

in which R is an alkyl radical and R' is hydrogen or an alkyl radical and n is a small whole number from 2 to 6. These radicals can be the same or different.

The present compounds are, in general, liquids which have a relatively high boiling point. They can be purified by distilling under reduced pressure.

The method by which the present compounds can be prepared may be illustrated by the following equations:

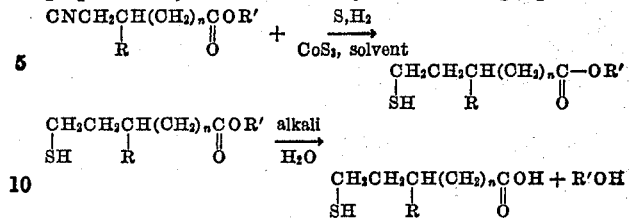

in which R is an alkyl radical and R' is hydrogen or an alkyl radical. The first step in the process above preferably is carried out in solvents such as acetic acid, ethanol, dioxane, benzene, etc., although the process can be carried out in the absence of a solvent, if desired. The reaction is carried out under a pressure of from 200 to 2,000 p. s. i. and a temperature of from 50° to 250° C. The reaction is completed within a period of four to 24 hours, depending upon the temperature and pressure.

Following completion of the reaction which is indicated when the uptake of hydrogen ceases, the catalyst is removed by filtration. The filtrate is freed of solvents by distillation and the residue taken up in acidic alcohol. The solution is then refluxed on a steam bath and poured into ice and water. The product is taken up in ether and following removal of the ether, distilled to give a pure product as an ester. The free acid can be obtained by saponification, as shown hereinafter in the examples.

The compounds of the present invention were tested for their antifungal and antibacterial activity using a standard agar dilution method. The results obtained are summarized in the following Table I:

TABLE I

| Compound | Mg./Ml. for Inhibition of— | | | | | | | | | |
|---|---|---|---|---|---|---|---|---|---|---|
| | Fungi | | | | | | Bacteria | | | |
| | C. a. | S. c. | M. r. | F. e. | H. c. | T. m. | Myco. | Staph. | Sarc. | Subt. |
| 6-Methyl-8-thioloctanoic acid | 0.5 | 0.5 | 0.5 | 0.5 | 0.5 | 0.06 | 1.0 | 1.0 | 1.0 | 0.5 |
| 6-Ethyl-8-thioloctanoic acid | 1.0 | 0.5 | 0.5 | 0.5 | 0.5 | 0.12 | 0.5 | 0.5 | 0.5 | 0.25 |
| 6-Propyl-8-thioloctanoic acid [6-(2-thiolethyl)-nonaoic acid] | 1.0 | 1.0 | 1.0 | 0.5 | 1.0 | 0.25 | 0.5 | 0.5 | 0.5 | 0.5 |
| 6-Butyl-8-thioloctanoic acid [6-(2-thiolethyl)-decanoic acid] | 1.0 | 0.5 | 0.5 | 0.5 | 1.0 | 0.12 | 0.5 | 1.0 | 1.0 | 1.0 |

Abbreviations:
Fungi—
  C. a.=Candida albicans
  S. c.=Saccharomyces carlsbergensis
  M. r.=Mucor ramannianus
  F. e.=Fusarium epispharia
  H. c.=Hormodendrum cladosphroides
  T. m.=Trichophyton mentagrophytes
Bacteria—
  Myco.=Mycobacterium sp. 607
  Staph.=Staphylococcus aureus
  Sarc.=Sarcina lutea
  Subt.=Bacillus subtilis The above table shows that the compounds of the present invention inhibit the growth of both fungi and bacteria. They can be used in solution or mixed with other liquid preparations as a spray or dip. They may also be incorporated with a diluent such as talc, clay, keislghur, etc. as a dusting powder. The present compounds have been found to inhibit the growth of bacteria, such as S. faecalis, C. bovis, and yeasts, such as T. cremoris, etc. The following Table II summarizes the results obtained.

TABLE II

| Compound | Mg./ml. for Inhibition of— | | |
|---|---|---|---|
| | S. faecalis 8043 | C. bovis B187 | T. cremoris 2512 |
| 6-Methyl-8-thiolocanoic acid | 0.035 | 0.050 | 0.050 |
| 6-Ethyl-8-thiolocanoic acid | 0.010 | 0.020 | 0.035 |
| 6-Propyl-8-thiolocanoic acid | 0.0025 | 0.025 | 0.10 |
| 6-Butyl-8-thiolocanoic acid | 0.0035 | 0.020 | 0.025 |
| 6-Isobutyl-8-thiolocanoic acid | 0.015 | 0.015 | |
| 5-Ethyl-7-thiolheptanoic acid | 0.02 | 0.05 | 0.05 |
| 4-Ethyl-6-thiolhexanoic acid | 0.05 | 0.1 | 0.075 |

The preparation of the alkyl thioaliphatic acids and esters of the present invention is illustrated by the following examples:

Example 1

6-oxoheptanoic acid was prepared by the method of Schaeffer and Snoddy (Organic Synthesis, 31:3, 1951). The yield of the material boiling at 142–145° C. at 1 mm. (S. and S. gave 122–123° C.) was 53.7%. This acid (5.37 moles) was esterified by dissolving in 2.2 liters of absolute methanol containing 22 ml. of concentrated sulfuric acid and refluxing for ten hours. The mixture was poured into three liters of water containing 900 g. of sodium chloride and 500 ml. of ether was added to collect the separated ester. The aqueous phase was extracted twice with 1 liter portions of ether and the combined ether extracts were washed with aqueous potassium bicarbonate followed by saturated sodium sulfate and finally dried over sodium sulfate. The solvent was removed at the water pump and the residue distilled through a 40-cm. Vigreaux column to give 673 g. (79.1%) of product, boiling at 114–120° C. at 15 mm. and $n_D^{20}$ 1.4310. A small sample of methyl 6-oxoheptanoate was redistilled through a 2.5 x 30 cm. Stedman column to give an analytical sample boiling at 120° C. at 14.2 mm. and having $n_D^{20}$ 1.4312 and $d_{20}$ 1.006.

In a 2-liter flask equipped with a thermometer and a 50 cm. column of glass rings leading to a phase separator were refluxed 634 g. (4.0 mole) of methyl 6-oxoheptanoate obtained above, 306 g. (3.6 mole) of cyanoacetic acid, 11.5 g. (0.148 mole) of ammonium acetate and 300 ml. of benzene until no more water was collected. Total reflux time was about 24 hours and about 76 ml. of water was collected. The column and phase separator were replaced with a take-off condenser and the benzene was removed at atmospheric pressure. The temperature was allowed to rise until the mixture began to decarboxylate (about 150–175° C.). The mixture was heated until no further carbon dioxide was evolved. Total collected was 57.77 liters (2.36 moles). After cooling the residue was taken up in 600–700 ml. of ether and the solution was washed with aqueous potassium carbonate and saturated sodium sulfate. After drying over sodium sulfate, the ether was removed on a steam cone and the residue was distilled through a 40 cm. Vigreaux column to give 478.4 g. (2.64 moles, 73.3% of theory) of material boiling at 130–138° C. at 4–4.3 mm. having $n_D^{20}$ 1.4599–1.4618. Redistillation through a 20 x 200 mm. column packed with Heli-pak gave an analytical sample boiling at 153° C. at 10 mm., having $n_D^{20}$ 1.4604 and $d_{20}$ 0.998. The distillation gave 91% recovery of methyl 7-cyano-6-methyl-6-heptenoate, boiling at 152.5–155.5° C. at 9.9–10.5 mm. with $n_D^{20}$ 1.4603–1.4612.

181.2 g. (1 mole) of methyl 7-cyano-6-methyl-6-heptenoate and 160 ml. ethyl alcohol were shaken with 5 g. 10% palladium on charcoal (Matheson) in a Parr low-pressure hydrogenation apparatus until approximately the theoretical amount of hydrogen was taken up. The reduction required about 48 hours. The catalyst was removed by filtration and the solvent was removed on the steam cone at the water pump. The residual oil was taken up in an equal volume of ether and washed with 1 N hydrochloric acid. It was stirred for ten minutes with 200 ml. of water containing 7.9 g. (0.05 mole) of potassium permanganate. The mixture was decolorized with sodium bisulfite and the ether phase was separated, washed with dilute ferrous sulfate, then with water, then with saturated sodium sulfate, and finally dried over sodium sulfate. Removal of the ether at the stream bath left a residual oil which was distilled through a 50-cm. Vigreaux column to give 159.9 g. (0.872 mole, 87.2%). The methyl 7-cyano-6-methylheptanoate boiled at 150–154° C. at 10.5 mm. and had $n_D^{20}$ 1.4410–1.4426. An analytical sample boiled at 152° C. at 10.5 mm. and had $n_D^{20}$ 1.4410 and $d_{20}$ 0.972.

To 360 ml. of water containing 96 g. (0.40 mole) of sodium sulfide nonahydrate was added 25.6 g. (0.80 g. at.) of sulfur. The solution was added all at once to a solution of 95.2 g. (0.40 mole) of cobalt chloride hexahydrate dissolved in 200 ml. water. Vigorous stirring for about three minutes gave a thin paste which was filtered on an 18 cm. Buchner with three Whatman #1 paper discs. The precipitate was washed with water until the filtrate was no longer pink (about 1 liter of water was required) and then with three 250 ml. portions of glacial acetic acid. The cake was squeezed as dry as possible with a rubber dam and the catalyst stored in a covered vessel at 4° C. overnight.

The catalyst, 47.4 g. (1.48 g. at.) of sulfur and 135 g. (0.738 mole) of methyl 7-cyano-6-methylheptanoate were hydrogenated in 280 cc. of acetic acid at 1000–1500 pounds per square inch. The temperature was gradually raised and at about 140° C. a sudden uptake of hydrogen indicated a reduction of the catalyst and the sulfur. When this initial reaction subsided, the temperature was gradually raised to 200° C. and held there until no further hydrogen uptake was observed. The reduction took about eight hours.

The catalyst was removed by filtration and washed with methanol. The filtrate was freed of solvents by distillation at the steam bath and water aspirator. The residue was taken up in 540 ml. of methanol containing 25 cc. (0.45 mole) of concentrated sulfuric acid. The solution was refluxed on the steam bath for 4½ hours, during which time a solid separated and caused some bumping. The mixture was then poured onto about 1.8 kg. of ice and water, 400 ml. of ether was added and after separating the layers, the aqueous phase was extracted with 125 cc. of ether. The combined ether phases were washed with aqueous potassium carbonate and water and then dried over sodium sulfate. The ether was removed on the steam cone and the residual oil distilled to give a crude product boiling at 118–136° C. at 1.7–1.9 mm. This material was then redistilled in a 20 x 200 mm. column packed with "Heli-pak" to give a product boiling at 137–142° C. at 10–10.3 mm. and having $n_D^{20}$ 1.4663–1.4687. The yield was 84.8 g. (0.415 mole, 56.2%). This material appeared to be contaminated with a small amount of some higher boiling impurity and to get an analytical sample, it was necessary to distill it through a Podbielniak column at 20 mm. with a 1:10 take-off rate. The analytical methyl 6-methyl-8-thiolocanoate boiled at 155° C. and had $n_D^{20}$ 1.4663 and $d_{20}$ 0.976.

Example 2

The compound methyl 6-oxooctanoate was prepared by the following modification of the method of Cason and Prout (Organic Synthesis, coll. vol. III, 601, 1955). Ethyl magnesium bromide was prepared from 500 g. (4.59 moles) of ethyl bromide and 111.3 g. (4.59 g. at.) of magnesium in a total of about 2.3 liters of ether in a 12-liter, 3-necked flask fitted with reflux condenser, dropping funnel and a direct-coupled stainless steel shaft with a Teflon paddle stirrer. With ice bath cooling 447 g. (2.44 moles, 5% excess) of anhydrous cadmium chloride was added over a period of ten minutes. The mixture was then stirred until the Grignard test (Michler's ketone) was negative. This required about one-half hour and 500 ml. of benzene was added to facilitate stirring. With good stirring and gentle heating 1200 ml. of ether-benzene was distilled. One liter of dry benzene was added and the distillation continued until another 600 ml. had been collected and then 1.5 liters of benzene was added as an additional 100 ml. of solvent was removed by distillation. At this point the reaction mixture was very thick and somewhat caked. Two liters of benzene was added and 668 g. of methyl 5-chloroformylvalerate (3.74 moles) in 500 ml. of dry benzene was slowly added. The addition required about thirty minutes and the reaction mixture gradually thinned, stirring become easier and gentle refluxing took place during the addition and for an additional ten minutes. The mixture was then allowed to stand overnight. The reaction mixture was spooned into a pot containing ice and water and was well stirred after the addition of 25 ml. of sulfuric acid to dissolve the salts. After the phases were separated the aqueous layer was extracted with benzene. The combined benzene extracts were washed with sodium carbonate and with water and then dried over sodium sulfate. The solvent was removed at the water pump and the residual oil was distilled through a 50-cm. Vigreaux column at 14 mm. to give 525.7 g. (81.8%) of methyl 6-oxooctanoate, boiling at 125–131° C. having $n_D^{20}$ 1.4337–1.4342.

Using the method described in Example 1, 505.5 g. (2.93 moles) of methyl 6-oxooctanoate, 230 g. (2.70 moles) cyanoacetic acid and 8.4 g. (0.108 mole) of ammonium acetate gave 328.6 g. (1.68 moles, 62.2% of theory) of methyl 7-cyano-6-ethyl-6-heptenoate, boiling at 140–153° C. at 4.4–4.7 mm. and having $n_D^{20}$ 1.4582–1.4602. An analytical sample from a previous smaller run boiled at 102° C. at 0.05 mm. and had $n_D^{20}$ 1.4612 and $d_{20}$ 0.983.

Reduction of 327.5 g. (1.68 moles) of methyl 7-cyano-6-ethyl-6-heptenoate in 250 ml. ethyl alcohol with 8.4 g. of 10% palladium on charcoal as catalyst required about six hours and gave a yield of 254.3 g. (1.29 moles, 77%) of methyl 6-cyanomethyloctanoate boiling at 138–142° C. at 4.6–4.8 mm. (a few grams up to 147° C.) having $n_D^{20}$ 1.4453–1.4470. An analytical sample of this material boiled at 141° C. at 4.6 mm. and had $n_D^{20}$ 1.4458 and $d_{20}$ 0.967.

Reduction of 197.3 g. (1.0 mole) of methyl 6-cyanomethyloctanoate by the method of Example 1 gave 138.5 g. (0.634 mole, 63.4%) of a compound boiling at 148–153° C. at 10.1 mm. and having $n_D^{20}$ 1.4695–1.4718 when distilled through a 20 x 200 mm. Heli-pak column. An analytical sample of this methyl 6-ethyl-8-thiooctanoate boiled at 148° C. at 10 mm. and had $n_D^{20}$ 1.4697 and $d_{20}$ 0.975.

*Example 3*

The compound methyl 6-oxononanoate was prepared as described in Example 2, replacing the overnight standing with one hour of refluxing. From 74.5 g. (3.06 g. at.) of magnesium, 377.3 g. (3.06 moles) n-propylbromide, 374 g. (1.64 moles) anhydrous cadmium chloride and 437 g. (2.45 moles) of methyl 5-chloroformylvalerate was obtained 411.1 g. (2.21 moles, 90.2%) of product boiling at 135–139° C. at 15 mm. having $n_D^{20}$ 1.4350–1.4358. An analytical sample boiling at 137° C. at 14.8 mm. had $n_D^{20}$ 1.4350 and $d_{20}$ 0.976.

By the method previously described above 123.2 g. (1.45 moles) cyanocetic acid, 4.55 g. (0.059 mole) of ammonium acetate and 299.4 g. (1.61 moles) of methyl 6-oxononanoate were reacted. The yield of material boiling at 140–144° C. (a few grams from 144–151° C.) at 3.1–3.4 mm. was 213.7 g. (1.02 moles, 70.3% of theory) having $n_D^{20}$ 1.4590–1.4611. An analytical sample of methyl 7-cyano-6-propyl-6-heptenoate, boiling at 142–142.5° C. at 3.25 mm., had $n_D^{20}$ 1.4601 and $d_{20}$ 0.970.

A reduction of 203.9 g. (0.973 mole) of methyl 7-cyano-6-propyl-6-heptenoate in 150 ml. of ethyl alcohol with 5 g. 10% palladium on charcoal as catalyst required about 24 hours. About 10% more than theory was absorbed. The yield of methyl 6-cyanomethylnonanoate boiling at 136–143° C. at 2.9–3.2 mm. and having $n_D^{20}$ 1.4460–1.4468 was 143.2 g. (0.679 mole, 69.7%). An analytical sample boiled at 141° C. at 3 mm. and had $n_D^{20}$ 1.4468 and $d_{20}$ 0.951.

Reduction by the method of Example 1 of 133 g. (0.63 mole) of methyl 6-cyanomethylnonanoate gave 92.2 g. (0.396 mole, 63.0%) of material boiling at 158–164° C. at 10.2–10.6 mm. having $n_D^{20}$ 1.4672–1.4710. The analytical sample of methyl 6-propyl-8-thiooctanoate boiled at 160° C. at 10.5 mm. and had $n_D^{20}$ 1.4678 and $d_{20}$ 0.966.

*Example 4*

The compound methyl 6-oxodecanoate was prepared by the procedure of Example 2 from 73 g. (3.0 g. at.) of magnesium, 411.1 g. (3.0 moles) n-butylbromide, 361.5 g. (1.58 moles of anhydrous cadmium chloride and 437 g. (2.45 moles) of methyl 5-chloroformylvalerate. The yield of product was 415.7 g. (2.08 moles, 84.9%) boiling at 145–152° C. at 13.5 mm. having $n_D^{20}$ 1.4361–1.4390. An analytical sample of methyl 6-oxodecanoate boiled at 148.8° C. and had $n_D^{20}$ 1.4377 and $d_{20}$ 0.960.

Using the process described in Example 1, 300.5 g. (1.50 moles) of methyl 6-oxodecanoate, 4.3 g. (0.056 mole) ammonium acetate and 119 g. (1.40 moles) cyanoacetic acid were reacted. The product was collected between 150.5 and 157.5° C. at 2.8–3.4 mm. and amounted to 222.4 g. (0.996 mole, 71.5% of theory) having $n_D^{20}$ 1.4583–1.4604. An analytical sample of methyl 7-cyano-6-butyl-6-heptenoate boiled at 152° C. at 3.2 mm. and had $n_D^{20}$ 1.4602 and $d_{20}$ 0.959.

Reduction of 211.8 g. (0.95 mole) of methyl 7-cyano-6-butyl-6-heptenoate in 150 ml. ethyl alcohol with 1.62 g. of 10% palladium on charcoal and 6.76 g. 5% palladium on charcoal as catalyst required about 17 hours. The hydrogen uptake was about 18% more than theory. The yield of methyl 6-cyanomethyldecanoate, boiling at 147–150° C. at 2.7–3.0 mm. and having $n_D^{20}$ 1.4495–1.4502 was 137 g. (0.608 mole, 64.0%). An analytical sample boiled at 149° C. at 2.9 mm. and had $n_D^{20}$ 1.4498 and $d_{20}$ 0.948.

Following the method of Example 1, 125.9 g. (0.56 mole) of methyl 6-cyanomethyldecanoate on reduction gave 89.0 g. (0.361 mole, 64.5%) of material boiling at 160–170° C. at 7.7 mm. and having $n_D^{20}$ 1.4680–1.4708. The analytical sample of methyl 6-butyl-8-thiooctanoate boiled at 163° C. at 7.7 mm. and had $n_D^{20}$ 1.4690 and $d_{20}$ 0.958.

*Example 5*

The compound methyl 8-methyl-6-oxononanoate was prepared as in Example 2 from 88.7 g. (3.65 g. at.) of magnesium, 500 g. (3.65 moles) of isobutylbromide, 361 g. (1.97 moles) of cadmium chloride and 532 g. (2.98 moles) of methyl 5-chloroformylvalerate. The yield was 187.8 g. (0.938 mole, 31.5%) of twice-distilled material boiling at 138.5–147° C. at 14.5–13.5 mm. having $n_D^{20}$ 1.4330–1.4363. An analytical sample of methyl 8-methyl-6-oxononanoate boiled at 140–141° C. at 13.7 mm. and had $n_D^{20}$ 1.4343 and $d_{20}$ 0.962.

By the method of Example 1, 377.8 g. (1.88 moles) of methyl 8-methyl-6-oxononanoate, 145.3 g. (1.71 moles) cyanoacetic acid and 5.43 g. (0.069 mole) ammonium acetate were reacted. The product was collected from 142–148° C. at 2.8–3.0 mm. The yield was 84.5 g. of methyl 7-cyano-6-isobutyl-6-heptenoate. An analytical sample boiled at 143–144° C. at 2.9 mm. and had $n_D^{20}$ 1.4588 and $d_{20}$ 0.954.

Reduction of 78.4 g. (0.351 mole) of methyl 7-cyano-6-isobutyl-6-heptenoate with 1.76 g. of 10% palladium on charcoal in 53 ml. ethyl alcohol required about 5½ hours. The hydrogen uptake was about 17% greater than theory. The product was collected at 144–145° C. at 2.7–3.1 mm., had $n_D^{20}$ 1.4541–1.4548, and amounted to 31.6 g. (0.14 mole, 40.0%). An analytical sample of methyl 6-cyanomethyl-8-methylnonanoate boiled at 144–145° C. at 2.8 mm. and had $n_D^{20}$ 1.4542 and $d_{20}$ 0.949.

Following the method of Example 1, 30.0 g. (0.133 mole) of methyl 6-cyanomethyl-8-methylnonanoate gave 5.3 g. of methyl 8-methyl-6-(2-thiolethyl) nonanoate, boiling at 168–172° C. at 16 mm. and having $n_D^{20}$ 1.4670–1.4678. An analytical sample boiled at 170–171° C. at 16 mm. and had $n_D^{20}$ 1.4673 and $d_{20}$ 0.959.

*Example 6*

By the method of Example 2, 107.5 g. (4.42 g. at.) of magnesium, 336 ml. (4.42 moles) of ethyl bromide, 426 g. (2.32 moles) of anhydrous cadmium chloride and 596.1 g. (3.62 moles) of methyl 4-chloroformylbutyrate gave 482.7 g. (3.05 moles, 84.2%) of methyl 5-oxoheptanoate boiling at 108–119° C. at 12.3 mm. having $n_D^{20}$ 1.4308–1.4327 and $d_{20}$ 1.009. The preparation of the compound has been described by Naylor, J. Chem. Soc., 1108 (1947).

Using the method of Example 1, 462.5 g. (2.92 moles) of the above ester, 230 g. (2.70 moles) of cyanoacetic acid, and 8.4 g. (0.108 mole) of ammonium acetate gave 288.5 g. (1.59 moles, 58.9%) of methyl 6-cyano-5-ethyl-5-hexenoate boiling at 130–138° C. at 4.5 mm. and having $n_D^{20}$ 1.4601–1.4603. An analytical sample boiled at 130° C. at 4.4 mm. and had $n_D^{20}$ 1.4601, and $d_{20}$ 1.006.

Catalytic reduction of 251.0 g. (1.40 moles) of the compound above by the method of Example 1 gave 181.0 g. (0.988 mole, 70.5%) of methyl 5-cyanomethylheptanoate, boiling at 128–134° C. at 5 mm., having $n_D^{20}$ 1.4442–1.4458. Analytical material had $n_D^{20}$ 1.4437 and $d_{20}$ 0.979.

Reduction in the presence of sulfur by the method of Example 1 of 158.4 g. (0.865 mole) of methyl 5-cyanomethylheptanoate gave 101.4 g. (0.596 mole, 57.5%) of methyl 5-ethyl-7-thiolheptanoate, boiling at 144.0–148.2° C. at 15.2–15.6 mm., having $n_D^{20}$ 1.4687–1.4715. Analytical material boiled at 147° C. at 15.5 mm. and had $n_D^{20}$ 1.4699 and $d_{20}$ 0.992.

*Example 7*

Using the method of Example 2, 111.8 g. (4.60 g. at.) of magnesium, 351 ml. (4.60 moles) ethyl bromide, 444.0 g. (2.42 moles) of anhydrous cadmium chloride and 567.6 g. (3.77 moles) of methyl 3-chloroformylpropionate gave 291.4 g. (2.02 moles, 53.5%) of methyl 4-oxohexanoate, boiling at 94.5–106° C. at 14 mm., having $n_D^{20}$ 1.4253–1.4293.

Using the method of Example 1, 285.3 g. (1.98 moles) of the above ester, 153.0 g. (1.80 moles) of cyanoacetic acid, 5.65 g. (0.0734 mole) of ammonium acetate gave 104.8 g. (0.627 mole, 34.9%) of methyl 5-cyano-4-ethyl-4-pentenoate, boiling at 115–147° C. at 5.8 mm. having $n_D^{20}$ 1.4553–1.4610. An analytical sample boiled at 129–130° C. at 5.8 mm. and had $n_D^{20}$ 1.4600 and $d_{20}$ 1.019.

Reduction of 93.7 g. (0.56 mole) of this compound by the method of Example 1 gave 58.9 g. (0.348 mole, 62.2%) of methyl 4-cyanomethylhexanoate, boiling at 113.8–122° C. at 4.8 mm., having $n_D^{20}$ 1.4438–1.4442. An analytical sample boiled at 145° C. at 15. mm. and had $n_D^{20}$ 1.4422 and $d_{20}$ 0.994.

Reduction in the presence of sulfur by the method of example 1 of 34.6 g. (0.204 mole) of the above gave 12.5 g. of methyl 4-ethyl-6-thiolhexanoate, boiling at 138–141° C. at 22 mm. having $n_D^{20}$ 1.4551–1.4614.

*Example 8*

The above esters of Examples 1 to 7 were saponified in approximately 6–8 N potassium hydroxide solution in 10–40 percent aqueous alcohol by refluxing for about two hours. The solutions were then diluted with water and neutralized to about pH 7.5 to 8 with carbon dioxide and hydrochloric acid and were extracted twice with ether. The aqueous phase was then acidified to pH 2 or less and again extracted with ether. These latter ether extracts were washed with water and dried over sodium sulfate. Removal of the ether left an oily residue which was distilled through a Claisen-head at low pressure to yield the corresponding acids.

Saponification of 32.9 g. (0.161 mole) of methyl 6-methyl-8-thioloctanoate gave 24.7 g. (0.130 mole, 81.3%) of 6-methyl-8-thioloctanoic acid boiling at 115–119° C. at 0.13–0.16 mm. having $n_D^{20}$ 1.4802. Analytical data obtained on sample boiling at 116.5° C. had $d_{20}$ 1.016.

*Example 9*

Saponification as described in Example 8 of 138.5 g. (0.634 mole) of methyl 6-ethyl-8-thioloctanoate gave 97.5 g. (0.477 mole, 75.3%) of 6-ethyl-8-thioloctanoic acid boiling at 125–128° C. at 0.11–0.18 mm. and having $n_D^{20}$ 1.4825–1.4831. An analytical sample had $n_D^{20}$ 1.4813 and $d_{20}$ 1.013.

*Example 10*

Saponification as in Example 8 of 77.0 g. (0.331 mole) of methyl 6-propyl-8-thioloctanoate gave 39.5 g. of 6-propyl-8-thioloctanoic acid boiling at 134–140° C. at 0.08 mm. after two distillations, having $n_D^{20}$ 1.4810–1.4801. An analytical sample boiled at 140° C. and had $n_D^{20}$ 1.4809 and $d_{20}$ 0.995.

*Example 11*

Saponification as in Example 8 of 78.6 g. (0.318 mole) of methyl 6-butyl-8-thioloctanoate gave 55.1 g. (0.237 mole, 74.4%) of 6-butyl-8-thioloctanoic acid boiling at 140–152° C. at 0.06–0.30 mm. having $n_D^{20}$ 1.4805–1.4810. The analytical material boiled at 141° C. at 0.1 mm. and had $n_D^{20}$ 1.4810 and $d_{20}$ 0.988.

*Example 12*

Saponification as in Example 8 of 4.6 g. (0.0186 mole) of methyl 6-isobutyl-8-thioloctanoate gave 2.6 g. (0.0112 mole, 60.5%) of 6-isobutyl-8-thioloctanoic acid boiling at 172–175° C. at 0.09–1.10 mm. having $n_D^{20}$ 1.4805–1.4810. The analytical material boiled at 173–174° C. at 1.0 mm. and had $n_D^{20}$ 1.4810 and $d_{20}$ 0.987.

*Example 13*

Saponification as in Example 8 of 92.0 g. (0.45 mole) of methyl 5-ethyl-7-thiolheptanoate gave 63.9 g. (0.336 mole, 74.6%) of 5-ethyl-7-thiolheptanoic acid boiling at 141–150° C. at 0.55–1.0 mm. having $n_D^{20}$ 1.4845–1.4840. An analytical sample boiled at 148° C. at 0.9 mm. and had $n_D^{20}$ 1.4842 and $d_{20}$ 1.031.

*Example 14*

Saponification as in Example 8 of 12.5 g. (0.0657 mole) of methyl 4-ethyl-6-thiolhexanoate gave 6.05 g. (0.0342 mole, 52.2%) of 4-ethyl-6-thiolhexanoic acid, boiling at 103–110° C. at 0.05 mm. and having $n_D^{20}$ 1.4829–1.4839. An analytical sample boiled at 106–107° C. at 0.05 mm. and had $n_D^{20}$ 1.4839 and $d_{20}$ 1.044.

We claim:

1. A method of preparing compounds having the formula

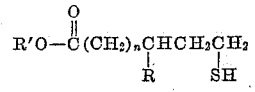

in which R is a lower alkyl radical, R' is a member of the group consisting of hydrogen and a lower alkyl radical and $n$ is a small whole number from 2 to 6 which comprises heating under pressure a compound having the structure

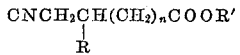

in which R and R' are as defined above, in the presence of hydrogen, sulfur, cobalt trisulfide and recovering said compound therefrom.

2. A method of preparing 6-methyl-8-thioloctanoic acid which comprises heating under pressure an ester of 7-cyano-6-methyloctanoic acid in the presence of hydrogen, sulfur, cobalt trisulfide and a solvent, removing the ester group by heating in an alkali metal hydroxide solution and recovering said compound therefrom.

3. A method of preparing 6-ethyl-8-thioloctanoic acid which comprises heating under pressure an ester of 6-cyanomethylheptanoic acid in the presence of hydrogen, sulfur, cobalt trisulfide and a solvent, removing the ester group by heating in an alkali metal hydroxide solution and recovering said compound therefrom.

4. A method of preparing compounds having the formula:

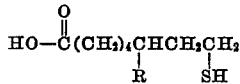

in which R is a lower alkyl radical which comprises heating under pressure an ester of a compound having the formula

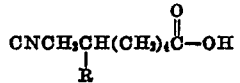

in which R is as defined above, in the presence of hydrogen, sulfur, cobalt trisulfide and a solvent, removing the ester group by heating in an alkali metal hydroxide solution and recovering said compound therefrom.

5. A method of preparing 6-propyl-8-thioloctanoic acid which comprises heating under pressure an ester of 7-cyano-6-propylheptanoic acid in the presence of hydrogen, sulfur, cobalt, trisulfide and a solvent, removing the ester group by heating in an alkali metal hydroxide solution and recovering said compound therefrom.

6. A method of preparing 6-butyl-8-thioloctanoic acid which comprises heating under pressure an ester of 7-cyano-6-butylheptanoic acid in the presence of hydrogen, sulfur, cobalt trisulfide and a solvent, removing the ester group by heating in an alkali metal hydroxide solution and recovering said compound therefrom.

7. A method of preparing 6-isobutyl-8-thioloctanoic acid which comprises heating under pressure an ester of 7-cyano-6-isobutylheptanoic acid in the presence of hydrogen, sulfur, cobalt trisulfide and a solvent, removing the ester group by heating in an alkali metal hydroxide solution and recovering said compound therefrom.

References Cited in the file of this patent

UNITED STATES PATENTS

| | | |
|---|---|---|
| 2,268,185 | Burke et al. | Dec. 30, 1941 |
| 2,568,648 | McCool | Sept. 18, 1951 |
| 2,752,374 | Acker et al. | June 26, 1956 |